UNITED STATES PATENT OFFICE.

PETER HAUPTMANN, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

AZO DYE.

1,073,754.     Specification of Letters Patent.     Patented Sept. 23, 1913.

No Drawing.     Application filed April 30, 1912. Serial No. 694,254.

*To all whom it may concern:*

Be it known that I, PETER HAUPTMANN, chemist, doctor of philosophy, citizen of the German Empire, residing at Leverkusen, near Cologne, Germany, have invented new and useful Improvements in New Azo Dye, of which the following is a specification.

I have found that new and valuable basic azo dyes can be obtained by combining the diazo compounds of aminobenzylamins, aminobenzylpyridins and aromatic ammonium bases with 2.4-dioxyquinolin. The new dyes thus obtained are after being dried and pulverized brownish-yellow powders yielding upon reduction with stannous chlorid and hydrochloric acid aminodioxyquinolin and dyeing artificial silk (Chardonnet silk, Glanzstoff, etc.,) greenish-yellow shades fast to light.

The new dyestuffs of the present invention are, when the above specified bases, (benzylamins, pyridins, etc.) are employed as starting materials, monoazo dyestuffs and have the following general formula: $R-N=N-R_1$, where R is the radical of an aromatic base and $R_1$ the radical of 2.4-dioxyquinolin as end component.

In order to illustrate the new process more fully the following example is given, the parts being by weight:—17 parts of the zinc double salt of para-aminobenzylpyridin are dissolved in 200 parts of water cooled with ice and diazotized at 10° C. with 5 parts of HCl (19° Bé.) and 2.5 parts of nitrite. Subsequently 6.1 parts of 2.4-dioxyquinolin are dissolved in 250 parts of hot water and 4 parts of NaOH (40 per cent.). After the addition of 3.5 parts of sodium carbonate the diazo compound is added thereto at about 5° C. The dyestuff is filtered off and dried. It dyes artificial silk in greenish-yellow shades; it has probably the following formula:

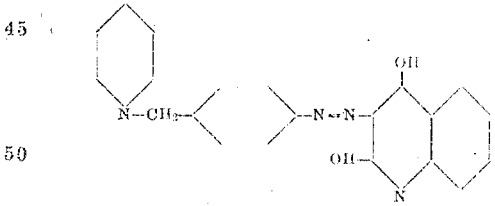

The new dye is after being dried and pulverized a brownish-yellow powder soluble in water with a greenish-yellow color and yielding upon treatment with stannous chlorid and hydrochloric acid aminodioxyquinolin.

The term aromatic base is used herein to indicate the bases, the amino derivatives of which (amino-benzylpyridin, etc.) are diazotized and used as starting materials for forming the azo dyestuffs.

I claim:—

1. As new products basic monoazo dyestuffs which contain 2.4-dioxyquinolin as end component, and yield upon reduction with stannous chlorid and hydrochloric acid aminodioxyquinolin.

2. As new products, basic monoazo dyestuffs of the following general formula: $R-N=N-R_1$, where R is the radical of an aromatic base, and $R_1$ the radical of 2.4-dioxyquinolin, which dyestuffs are after being dried and pulverized brownish-yellow powders, yielding upon reduction with stannous chlorid and hydrochloric acid aminodioxyquinolin and dyeing artificial silk directly greenish-yellow shades fast to light, substantially as described.

3. As new products, basic monoazo dyestuffs of the following general formula: $R-N=N-R_1$, where R is the radical of a benzyl pyridin, and $R_1$ is the radical of dioxyquinolin which dyes are after being dried and pulverized brownish-yellow powders, yielding upon reduction with stannous chlorid and hydrochloric acid aminodioxyquinolin and dyeing artificial silk directly greenish-yellow shades fast to light, substantially as described.

4. As a new product the basic monoazo dye which can be obtained by combining diazotized para-aminobenzyl pyridin with dioxyquinolin, which dye after being dried and pulverized is a brownish-yellow powder soluble in water with a greenish-yellow color yielding upon reduction with stannous chlorid and hydrochloric acid aminodioxyquinolin and dyeing artificial silk directly greenish-yellow shades, substantially as described.

In testimony whereof I have hereunto set my hand in the presence of two subscribing witnesses.

PETER HAUPTMANN. [L. S.]

Witnesses:
  HELEN NUFER,
  ALBERT NUFER.